United States Patent Office 2,726,920
Patented Dec. 13, 1955

2,726,920

COLORED STRUCTURES OF POLYAMIDES AND POLYURETHANES

Wilhelm Federkiel, Frankenthal, Pfalz, and Helmut Pfitzner and Hans Baumann, Ludwigshafen (Rhine), Germany, assignors to Badische Anilin- & Soda-Fabrik Aktiengesellschaft, Ludwigshafen am Rhein, Germany No Drawing. Application November 21, 1952, Serial No. 321,938

Claims priority, application Germany December 5, 1951

3 Claims. (Cl. 8—4)

This invention relates to colored structures of polyamides or polyurethanes.

Numerous dyestuffs are known for the dyeing of structures of polyamides and polyurethanes. Thus for example for the dyeing of these structures there can be used the dyestuffs usually serving for dyeing wool and silk, such as acid dyestuffs or mordant dyestuffs. According to another known process, structures of polyamides or polyurethanes may be dyed by treatment with complex metal compounds of azo dyestuffs or azomethine dyestuffs which contain no sulfonic acid groups. Although these last-mentioned dyestuffs give very fast dyeings, there are still gaps in the color scale of these dyestuff groups. For example a dyestuff which will give pure, fast green dyeings is lacking.

We have now found that structures of polyamides or polyurethanes can be dyed powerful, clear, green and other shades of color with excellent fastness by treating the structures with aqueous solutions of dispersions of complex metal compounds of hydroxynitroso compounds which are free from sulfonic acid groups and which contain complex-forming groups on adjacent carbon atoms.

Suitable hydroxynitroso compounds, which may also be present in the form of their tautomeric ortho-quinone-mono-oximes or 1.2-isonitrosoketones, are for example the nitrosation products of mono- or poly-hydroxy derivatives of isocyclic or heterocyclic compounds, such as 1-nitroso-2-hydroxynaphthalene, 2-nitroso-1-hydroxynaphthalene, 1-nitroso - 2.6 - dihydroxynaphthalene, 1 - nitroso - 2.7 - dihydroxynaphthalene, 1 - nitroso - 2 - hydroxynaphthalene - 6 - sulfonamide, 1.3 - dinitroso - 2.4 - dihydroxybenzene, 3 - nitroso - 2.4 - dihydroxy - quinoline, 1 - phenyl - 3 - methyl - 4 - nitrosopyrazolone - (5), 9 - nitroso - 10 - hydroxyphenanthrene, and also nitrosation products of aliphatic 1.3-dicarbonyl compounds or mono-oximes of 1.2-diketones, as for example nitroso-aceto-acetic acid anilide and nitroso-acetylacetone.

As complex-forming metals it is preferable to use those having classification numbers of 24 to 30, as for example manganese, iron, cobalt and nickel, as well as similar complex-forming metals, such as cadmium and molybdenum.

The structures to be dyed are preferably in the form of fabrics, fibres, flakes or bands; other shaped articles and similar structures can however be dyed according to the present invention. Mixed fabrics of polyamides or polyurethanes and oher synthetic or natural fibres may also be dyed with these dyestuffs.

It is preferable to add a dispersing agent, as for example the condensation product from naphthalene-2-sulfonic acid and formaldehyde, to the aqueous solutions or dispersions of the dyestuffs when carrying out the process. If desired, polyhydroxyalkyl ethers, as for example the reaction product from 1 mol of octodecyl alcohol and 25 mols of ethylene oxide, can also be added to the dyebaths. Dyeing may be carried out in weakly alkaline, neutral or acid region, and variations in pH may also be carried out during the dyeing process.

The following examples will further illustrate this invention but the invention is not restricted to these examples.

Example 1

2 grams of the complex iron compound of 1-nitroso-2-hydroxynaphthalene, which have been mixed with the same amount of the condensation product from naphthalene-2-sulfonic acid and formaldehyde, are introduced into 2 litres of hot water, and 4 grams of ammonia (30%) and 4 grams of the hydroxyethylation product from 1 mol of sperm oil alcohol and 24 mols of ethylene oxide are added. 100 grams of polyamide fibres are dyed in this dyebath for an hour at boiling temperature. 4 grams of ammonium sulfate are then added and the bath is again heated to boiling for half an hour. The bath is completely exhausted and uniform, powerful and clear green dyeings with excellent fastness properties are obtained.

If the corresponding complex nickel compound is used instead of the iron compound of 1-nitroso-2-hydroxynaphthalene, olive-brown dyeings are obtained.

Example 2

3 grams of the complex cobalt compound of 1-nitroso-2.7-dihydroxynaphthalene are dissolved in 10 cubic centimetres of ethyl alcohol and diluted with 2 litres of hot water. 100 grams of polyamide flakes are added to the bath and dyed for half an hour at the boiling temperature, 4 grams of ammonium sulfate are then added and the bath boiled for another hour. Deep red-brown dyeings are obtained.

If the corresponding nickel complex compound is used instead of the complex cobalt compound, olive dyeings are obtained. The corresponding cadmium compound gives a mid-brown shade of color and the complex iron compound gives a green shade of color.

Example 3

2 grams of the complex nickel compound of 2-nitroso-1-hydroxynaphthalene, mixed with the same amount of the condensation product from naphthalene-2-sulfonic acid and formaldehyde, are introduced into 3 litres of hot water. 3 cubic centimetres of acetic acid (30%) are added to the bath and 100 grams of polyamide fabric are dyed therein for 1½ hours at the boiling temperature. Beautiful and powerful orange-yellow dyeings are obtained.

By using the corresponding complex iron compound instead of the nickel compound, an olive-green shade is obtained.

Example 4

2 grams of the complex iron compound of 1.3-dinitroso-2.4-dihydroxybenzene are mixed with 2 grams of the condensation product from naphthalene-2-sulfonic acid and formaldehyde and dispersed in 1 litre of hot water, 100 grams of polyamide in the form of slivers are dyed in this dyebath as in Example 1. Deep dark-green dyeings are obtained.

By employing the cobalt complex compound of 1.3-dinitroso-2.4-dihydroxybenzene, yellow-brown dyeings are obtained.

Example 5

3 grams of the complex iron compound of 9-nitroso-10-hydroxyphenanthrene, when used for dyeing in the manner described in Example 2, yield a powerful green shade on 100 grams of polyurethane fibres.

Example 6

A reddish-yellow dyeing is obtained on 100 grams of polyamide flakes by dyeing with 2 grams of the complex cobalt compound of 3-nitroso-2.4-dihydroxyquinoline by the method of Example 1.

The iron compound of 3-nitroso-2.4-dihydroxyquinoline yields blue-green dyeings.

*Example 7*

3 grams of the complex cobalt compound of nitroso-aceto-acetic acid anilide are mixed with 3 grams of the condensation product from naphthalene-2-sulfonic acid and formaldehyde and dispersed in 1 litre of hot water. 100 grams of polyamide fibres are treated for 2 hours in this dyebath at 80° to 100° C. The fibres are dyed orange-yellow.

If the corresponding iron compound is used instead of the complex cobalt compound of nitroso-aceto-acetic acid anilide, blue dyeing are obtained.

*Example 8*

100 grams of polyamide fibres are dyed in 2000 grams of water, which contain 1 gram of the complex iron compound of 1-nitroso-2-oxynaphthalene-6-sulfonamide and 2 grams of concentrated sulfuric acid at boiling temperature for 1 hour. After the usual rinsing and drying polyamide fibres are obtained which are dyed clear deep green shades of excellent fastness properties.

What we claim is:

1. Structures of synthetic materials selected from the class consisting of polyamides and polyurethanes colored with a compound selected from the class consisting of the complex iron compounds of 1-nitroso-2-hydroxynaphthalene, 1-nitroso-2.6-dihydroxynaphthalene, 1-nitroso-2.7-dihydroxynaphthalene, and 1-nitroso-2-hydroxynaphthalene-6-sulfonamide.

2. Structures of synthetic material selected from the class consisting of polyamides and polyurethanes colored with the complex iron compound of 1-nitroso-2-hydroxynaphthalene.

3. Structures of synthetic materials selected from the class consisting of polyamides and polyurethanes colored with the complex iron compound of 1-nitroso-2-hydroxynaphthalene-6-sulfonamide.

References Cited in the file of this patent

UNITED STATES PATENTS

| | | |
|---|---|---|
| 1,529,891 | Immerheiser | Mar. 17, 1925 |
| 2,178,809 | Rosenblatt | Nov. 7, 1939 |
| 2,374,106 | Kvalnes | Apr. 17, 1945 |

FOREIGN PATENTS

| | | |
|---|---|---|
| 582,689 | Germany | Aug. 21, 1933 |
| 629,473 | Great Britain | Sept. 21, 1949 |